(12) United States Patent
Wang et al.

(10) Patent No.: US 6,834,898 B2
(45) Date of Patent: Dec. 28, 2004

(54) ACTUATOR MOUNTING AND METHOD FOR MOTOR VEHICLE BUMPER

(75) Inventors: Jenne-Tai Wang, Troy, MI (US); Gary L. Jones, Farmington Hills, MI (US); Ching-Shan Cheng, Canton, MI (US); Heui Su Kim, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/370,873

(22) Filed: Feb. 20, 2003

(65) Prior Publication Data

US 2004/0164567 A1 Aug. 26, 2004

(51) Int. Cl.[7] .............................................. B60R 19/40
(52) U.S. Cl. ...................................................... 293/118
(58) Field of Search .......................... 293/24, 25, 118, 293/119, 132, 133, 135, 136, 137

(56) References Cited

U.S. PATENT DOCUMENTS

| | | | | |
|---|---|---|---|---|
| 3,346,292 A | * | 10/1967 | Lundman | 293/118 |
| 3,355,208 A | * | 11/1967 | Brock | 293/118 |
| 3,947,061 A | * | 3/1976 | Ellis | 293/118 |
| 4,167,282 A | * | 9/1979 | Matsuyama | 293/136 |
| 4,272,114 A | * | 6/1981 | Hirano et al. | 293/133 |
| 4,624,493 A | * | 11/1986 | Hillebrand et al. | 293/136 |
| 4,830,417 A | * | 5/1989 | Bates et al. | 293/132 |
| 5,273,330 A | * | 12/1993 | Petry et al. | 293/132 |
| 5,370,429 A | | 12/1994 | Reuber et al. | |
| 5,967,573 A | | 10/1999 | Wang | |
| 6,089,628 A | | 7/2000 | Schuster | |
| 6,224,120 B1 | * | 5/2001 | Eipper et al. | 293/118 |
| 6,302,458 B1 | | 10/2001 | Wang et al. | |
| 6,401,565 B1 | * | 6/2002 | Wang et al. | 293/132 |
| 6,709,035 B1 | * | 3/2004 | Namuduri et al. | 293/118 |

* cited by examiner

Primary Examiner—Jason Morrow
(74) Attorney, Agent, or Firm—Kathryn A. Marra

(57) ABSTRACT

An actuator is adapted to selectively extend and retract a bumper member, the actuator is mounted at least partially within a tubular frame rail member of the motor vehicle. The main frame rail member may be of a standard length or of a shortened length. By mounting the actuator inside the tubular frame rail member, the bending stiffness is more effectively impacted by the outer tube of the actuator. An additional tubular frame rail member is optionally attached to the main tubular frame rail member. The actuator is mounted at least partially within the tubular frame rail member and at least partially within the additional tubular frame rail member. The wall thickness and cross-sectional shape of the additional tubular frame rail members may be adjusted to obtain a desired bending stiffness including the effect of the outer tube of the actuator.

19 Claims, 5 Drawing Sheets

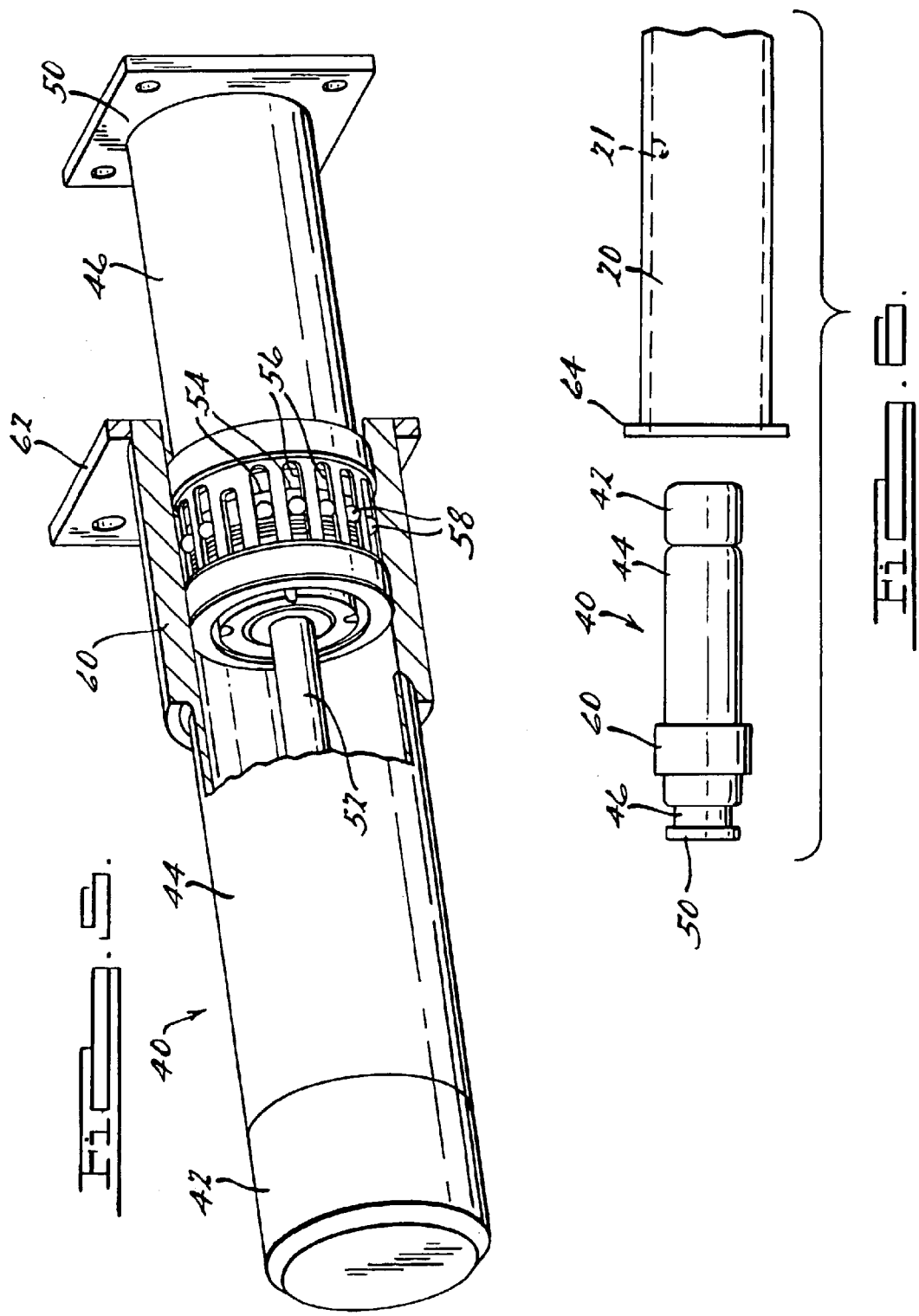

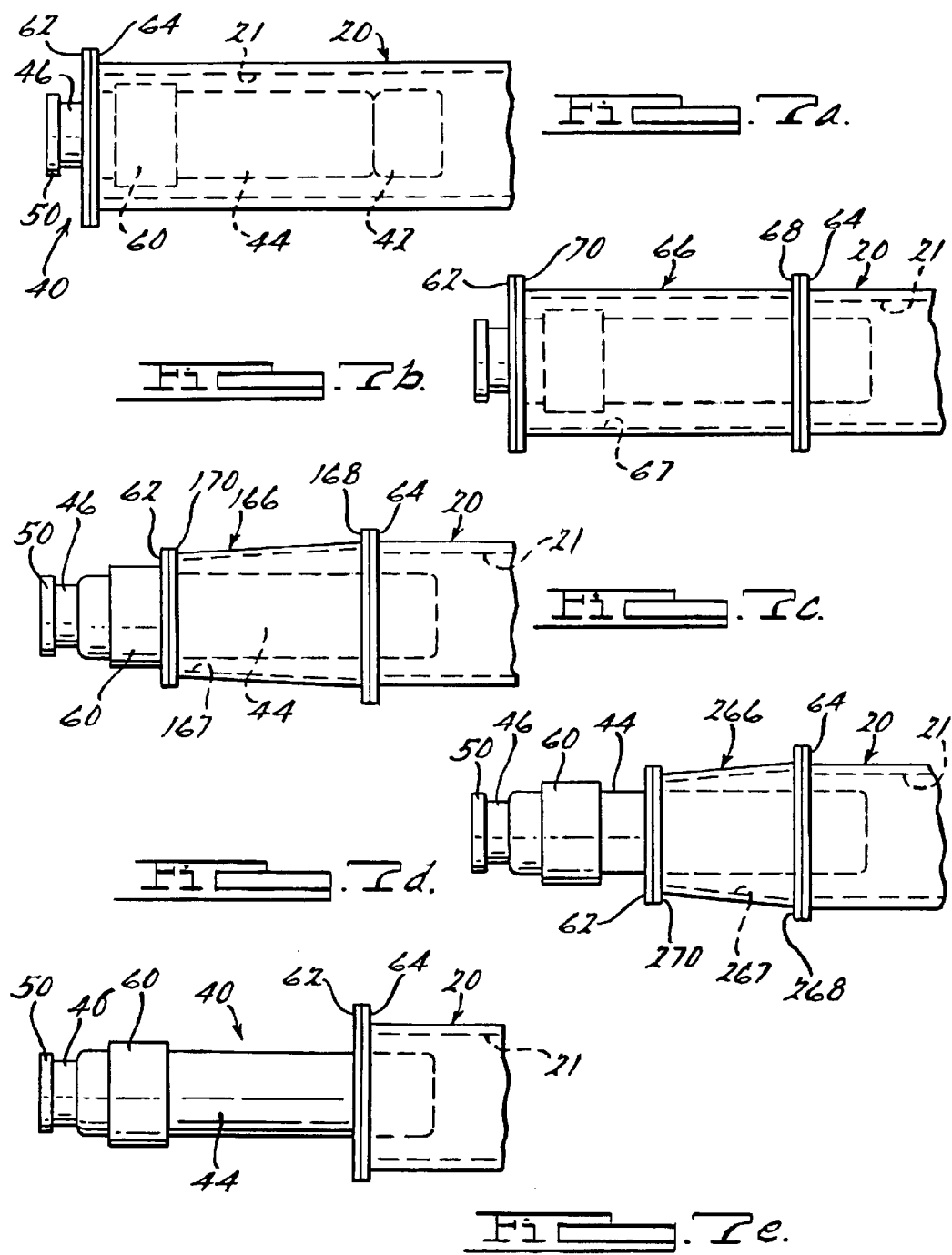

US 6,834,898 B2

ACTUATOR MOUNTING AND METHOD FOR MOTOR VEHICLE BUMPER

FIELD OF THE INVENTION

The present invention relates to motor vehicle bumper systems.

BACKGROUND OF THE INVENTION

A motor vehicle typically has a bumper bar supported on a body of the motor vehicle by energy absorbers which convert into work a fraction of the kinetic energy of a low speed impact on the bumper bar. Such bumper energy absorbers commonly include relatively moveable structural elements attached to the body and the bumper bar and a resistance medium between the structural elements. In a high speed impact, kinetic energy is converted into work by plastic deformation of body structure of the motor vehicle between a passenger compartment thereof and the point of impact. As motor vehicles have become more compact, however, the energy absorbing capability of the body structure of the motor vehicle has decreased as the span between the passenger compartment and the bumper bar has decreased.

A bumper energy absorber has been provided which supports a bumper bar close to a body of a motor vehicle except when sensors on the vehicle detect an impending impact. In that circumstance, the bumper energy absorber extends the bump bar out from the body to increase the span between the passenger compartment and the bumper bar and thereby increase the fraction of the kinetic energy of a high speed impact on the bumper bar that is converted into work. Exemplary outwardly extending bumpers are described, e.g., in U.S. Pat. No. 6,302,458, U.S. Pat. No. 5,967,573 and U.S. Pat. No. 5,370,429.

SUMMARY OF THE INVENTION

In accordance with a first aspect of the present invention a bumper system for a motor vehicle includes a main tubular frame rail member. An actuator is adapted to selectively extend and retract a bumper member, the actuator is mounted at least partially within the tubular frame rail member.

In accordance with another aspect of the present invention a bumper system for a motor vehicle includes a main tubular frame rail member. An additional tubular frame rail member is attached to the main tubular frame rail member. An actuator is adapted to selectively extend and retract a bumper member, the actuator being mounted at least partially within the tubular frame rail member and at least partially within the additional tubular frame rail member.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is a fragmentary cross-sectional view of a preferred actuator for extending and retracting the bumper illustrated in its extended position;

FIG. 6 is an expanded, elevational view of a preferred actuator and a preferred main tubular frame rail member;

FIGS. 7a to 7e are elevational views of alternatives for attaching the preferred actuator to a preferred full length tubular frame rail member;

DETAILED DESCRIPTION OF THE PREFERRED EMBODIMENTS

The following description of the preferred embodiment(s) is merely exemplary in nature and is in no way intended to limit the invention, its application, or uses. For example, although the invention is illustrated and described in association with a stiffening member, such a member is not required.

Figure 1:
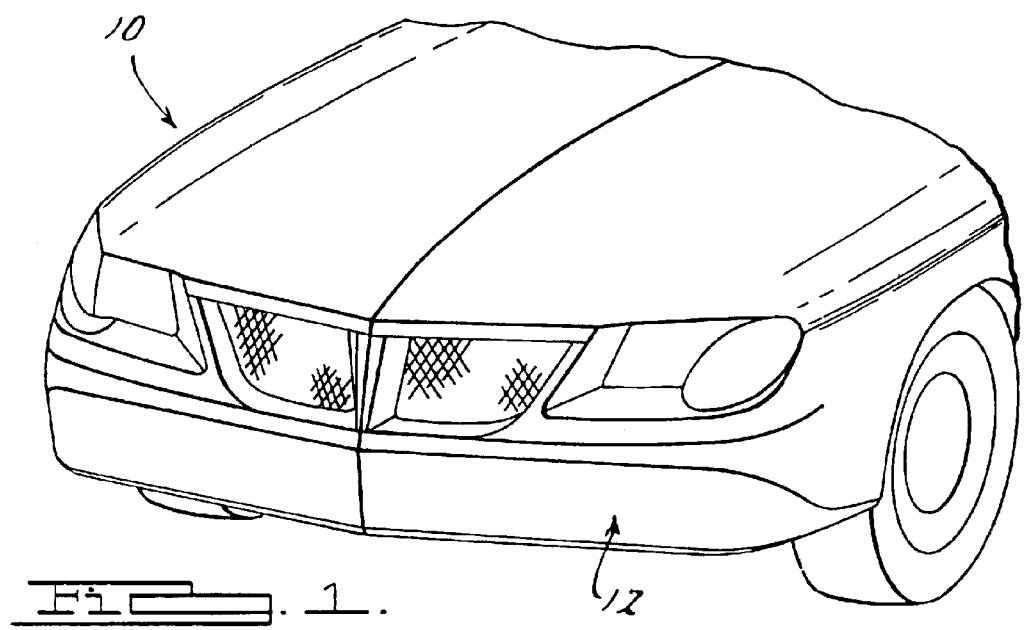
FIG. 1 is a fragmentary perspective view of an automobile with a preferred bumper system of the present invention illustrated in its retracted position.
Figure 2:
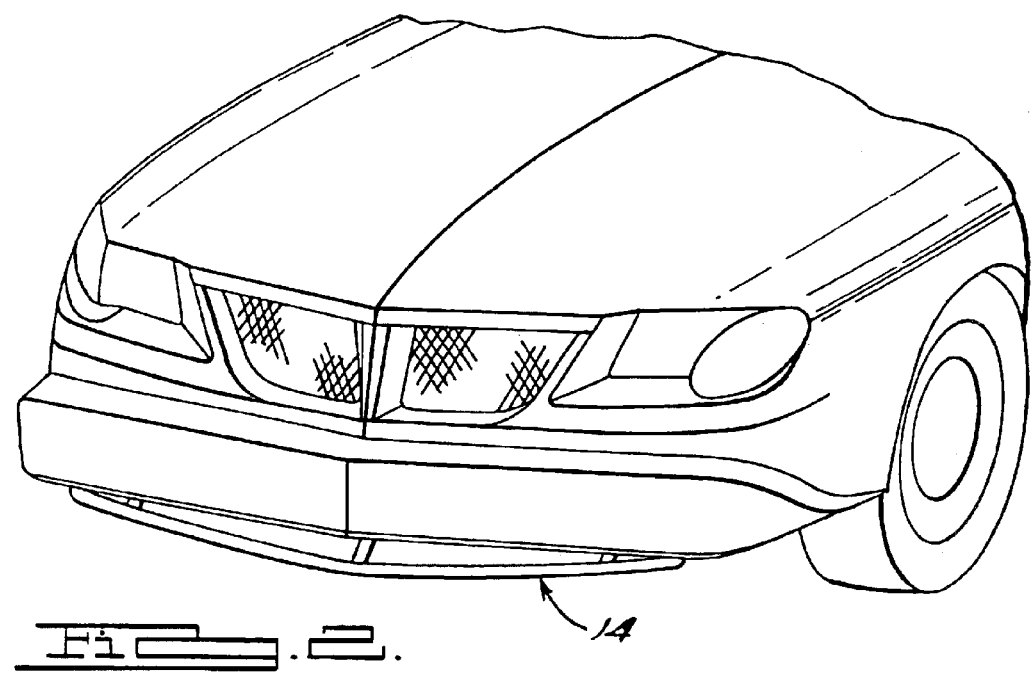
FIG. 2 is a fragmentary perspective view similar to FIG. 1, but with the preferred bumper system in its extended position.

Referring to FIG. 1, a motor vehicle 10 having a preferred bumper system including a deployable or extendable bumper member 12 and combined stiffener 14 is illustrated in the retracted or stowed position. FIG. 2 illustrates the preferred bumper system in its deployed or extended position. As can be seen by comparing FIG. 1 with FIG. 2, the bumper system generally includes a horizontal, transverse bumper member 12 which is extended laterally, in a generally linear direction, to its deployed or extended position. Similarly, a stiffener member 14 is likewise extended downwardly to its deployed or extended position.

Figure 3:
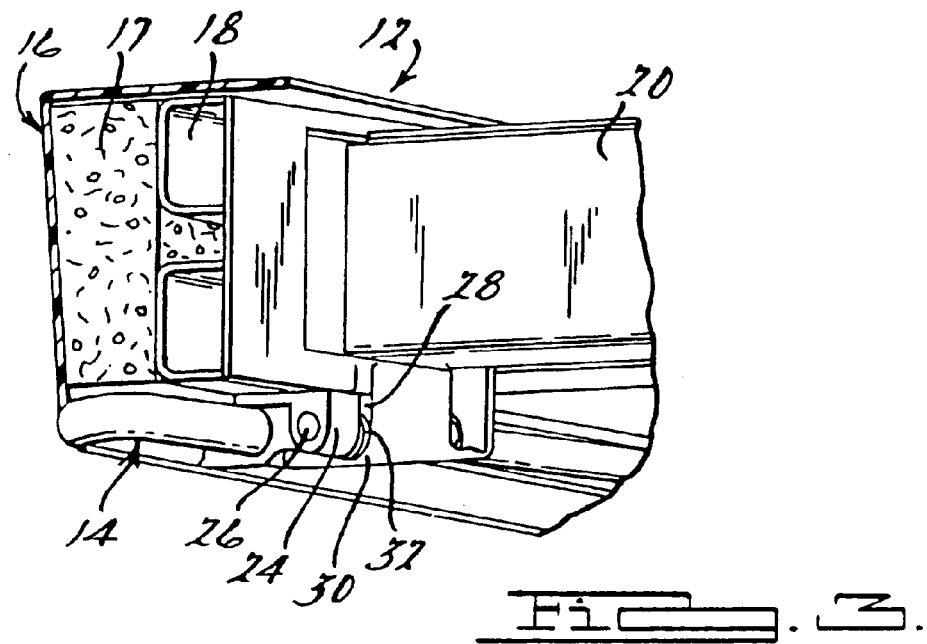
FIG. 3 is a fragmentary perspective view from below of the bumper system in its retracted position.

Referring to FIG. 3, the preferred bumper system is illustrated in the retracted or stowed position. Only the left side of the bumper system is illustrated, since both the left and right sides are symmetrical. The bumper member 12 includes a bumper beam 18 which is attached to the frame rail 20 via an extension tube 22 (seen in FIG. 4). The exterior face of the bumper beam 18 is covered by a fascia 16 including an energy absorbent material 17. Attached to the lower surface of the bumper beam 18 is a hinge block 24. A pivot shaft 26 extends through the hinge block 24 and through a pivot arm 28 of the stiffener member 14 to pivotally attach the bumper beam 18 and the stiffener member 14 together.

A contact flange 30 is attached to the lower surface of a frame rail 20 of the motor vehicle 10. In the illustrated retracted position, the contact flange 30 pushes against the stiffener member 14; overcoming the weight of the stiffener member 14 and the biasing force of the spring member 32 to maintain the stiffener member 14 in its raised or retracted position. Thus, when the bumper member 12 in its retracted position, the stiffener member 14 is also located in its retracted position as a result of the interaction between the contact flange 30 and the stiffener member 14.

Figure 4:
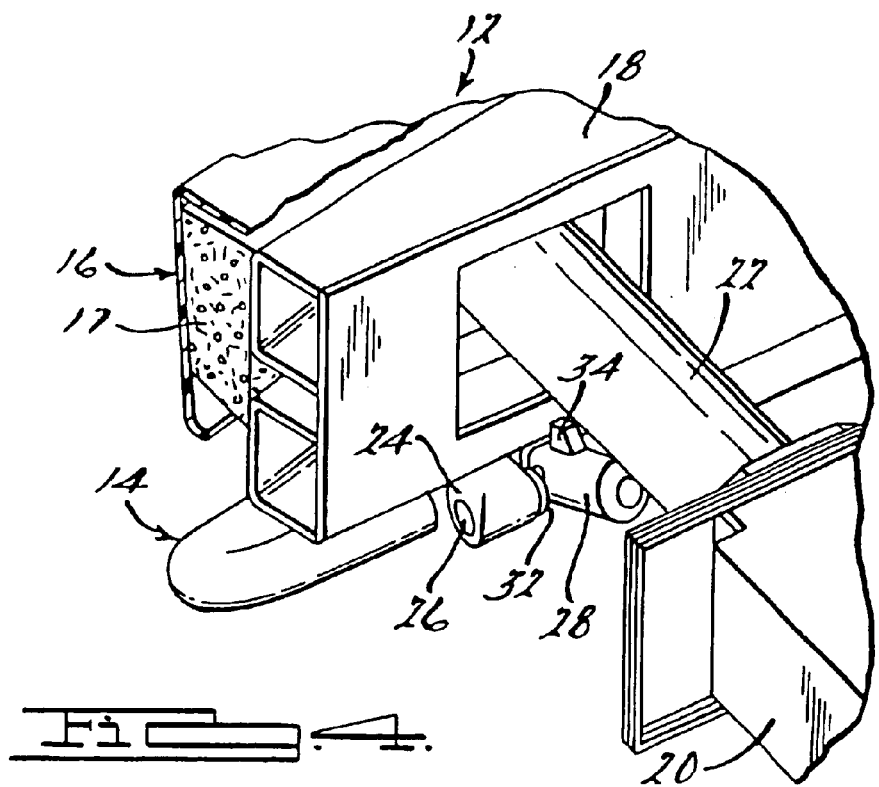
FIG. 4 is a fragmentary perspective view from above of the bumper system in its extended position.

Referring to FIG. 4, the bumper member 12 is moved laterally, linearly outwardly into its deployed or extended position by an extension tube 22 which is part of the actuation mechanism. During this movement the contact flange 30 is moved out of contact with the stiffener member 14. As a result, the stiffener member 14 is able to rotate in response to gravity and the biasing force of the spring 32 into its deployed position. A stop 34 located on the pivot arm 28 of the stiffener member 14 engages against the bumper beam 18 to cause the rotation of the stiffener member 14 to cease; appropriately positioning it. Thus, the stiffener member 14 is extended downwardly via rotary movement about the pivot shaft 26 into its deployed position, where the stop 34 engages against the bumper beam 18. Gravity and the spring 32 continue to bias the stiffening member 14 toward this downwardly extended position.

Based on the above, it should be apparent that the bumper system has two modes of operation. In a first mode the bumper system is in its retracted position. In this mode, the bumper member 12 is retracted inwardly, toward the vehicle body. Similarly, the stiffener member 14 is retracted upwardly and is generally concealed behind the fascia 16 of the bumper. The bumper system may be placed in an impact mode under certain conditions. In this impact mode the bumper member 12 and stiffener member 14 are extended as previously described. A pre-crash sensor (not seen) may be provided to determine whether there is a heightened risk of an impact. The sensor uses, for example, radar, infrared light and/or a visual image system to detect the heightened risk of impact.

Placing the bumper system in an impact mode is accomplished by extending the bumper member 12 outwardly. This is done by activating an actuator 40 in the situations discussed above. The actuator 40 linearly extends the extension tube 22, causing the bumper member 12 to extend linearly outwardly away from the motor vehicle body. As described above, this action causes the stiffener member 14 to be rotated to extend downwardly as a result of the pivot arm 28 moving away from the contact flange 30. The rotation continues until the stop 34 is reached.

Referring to FIG. 5, a preferred actuator mechanism 40 is illustrated in connection with a bumper system of a motor vehicle 10. The actuator mechanism 40 also operates as a bumper energy absorber and generally includes a base 42, an outer tube 44 and an inner tube 46. The inner tube 46 is supported on the outer tube 44 for back and forth linear translation. The cross sectional shape of the inner tube 46 matches the cross sectional shape of the outer tube 48. A distal end of the inner tube 46 is attached to the extension tube 22 via flange 50. Alternatively, the inner tube 46 is attached directly to the bumper bar 18. In either case, the inner tube 46 and the bumper bar 18 are supported by the outer tube 44 for linear translation between the retracted position of FIGS. 1 and 3 and the extended position of FIGS. 2 and 4. In its retracted and extended positions, the bumper bar 18 is close to the motor vehicle body 12 and more remote from the body 12, respectively.

The movement between the retracted and extended positions is driven by an actuator rod 52 which is operatively connected to a drive mechanism (not shown). The actuator 40 includes a plurality of wedge-shaped grooves 54 in the outer cylindrical wall surface of the inner tube 46 facing the inner cylindrical wall surface of the outer tube 44. The inner tube 46 is interrupted by a plurality of radial slots 56 which intersect respective ones of the wedge-shaped grooves 54. A hard sphere 58, e.g. steel spheres, is disposed in each of the wedge-shaped grooves 54 over the radial slots 56 in the inner tube 46. The diameters of the spheres 58 are substantially the same as the depths of the wedge-shaped grooves 54 at the deep ends thereof to minimize contact between the spheres 58 and the inner cylindrical wall of the outer tube 44 when the spheres 58 are lodged at the deep ends of the wedge-shaped grooves 54. Thus, upon the bumper bar 18 in its extended position contacting an object the spheres 58 are wedged between the inner tube 46 and the outer tube 44; thereby resisting the linear translation of the tubes 44 and 46 relative to each other toward the retracted position. Additional detail is provided in U.S. Pat. Nos. 6,401,565, 6,302, 458 and 5,967,573, hereby incorporated herein by reference.

Referring to FIG. 6, the hollow tubular main frame rail member 20 is illustrated. This tubular main frame rail member 20 is a part of the motor vehicle frame extending toward the front of the vehicle 10. In addition, the actuator 40 is schematically illustrated. As seen in FIG. 6, the outer tube 44 of the actuator 40 includes an enlarged diameter segment 60. This enlarged diameter segment 60 is useful for contacting the inner wall of the tubular frame rail 20 and/or for attachment thereto. The distal end of the inner tube 46 includes a flange 50 for attaching the inner tube 46 to the bumper bar 18, for example via extension member 22. The connecting flange member 62 of the actuator 40 as seen in FIG. 5 is not illustrated in FIG. 6, since it may be located at any point along the outer tube 44 and/or base 42 as discussed hereinafter. The attachment of the actuator 40 to the hollow tubular frame rail member 20 utilizes the flange 62 of the actuator 40 and the flange 64 of the frame rail member 20. At least a portion of the actuator 40 is located within the tubular frame rail member 20. By mounting the actuator 40 inside the tubular frame rail member 20, the bending stiffness is more effectively impacted by the outer tube 44 of the actuator 40.

Referring to FIGS. 7a through 7e, various preferred mounting arrangements for the actuator 40 are shown for use with a standard length tubular frame rail member 20. With the embodiment of FIG. 7a the entire outer tube 44 is located within and surrounded by the main tubular frame member 20. The actuator 40 includes a flange 62 that is attached to a cooperating flange 64 on the main frame rail member 20. As a result of this structure the outer tube 44 increases the bending stiffness of the main frame rail member 20 in all directions. For example, during an impact the outer tubular member 44 (including the base 42 and the enlarged diameter segment 60) will contact the wall of the main frame rail member 20 and strengthen the bending stiffness of the main frame rail member 20.

With the embodiment of FIG. 7b an additional frame rail member 66 is provided as an extension to the standard length main frame rail member 20. The additional frame rail member 66 includes a flange 68 which is used for attachment with the cooperating flange 64 on the main frame rail member 20. Another flange 70 is used for attachment with the cooperating flange 62 of the actuator 40. In the illustrated embodiment, the circumferential wall 67 of the additional frame rail member 66 is thinner than the circumferential wall 21 of main frame rail member 20. Thus, the bending stiffness of the frame rail 20, 66 in the area of the additional frame rail member 66 with the outer tube 44 of the actuator 40 may be the same as that of the main frame rail member 20 alone. The thickness of the walls 67 can alternatively be adjusted even thinner to provide a lower bending stiffness or adjusted thicker to provide a higher bendin stiffness than the original main frame rail member 20 alone.

Referring to FIGS. 7c and 7d, the additional frame rail members 166 and 266 have a generally trapezoidal shape in axial cross-section. Thus, they tend to add less mass than, for example, that of FIG. 7b. Again, the thickness of the walls 167, 267 of these additional frame rail members 166 and 266, respectively, can be adjusted, although these embodiments tend to have lower bending stiffness than that of FIGS. 7a and 7b. The main frame rail member 20, additional frame rail members 166, 266 and actuator 40 are attached using cooperating flanges 64 with 168, 62 with 170, 64 with 268, and 62 with 270, as previously described. In each of the embodiments of FIGS. 7c and 7d, the outer tube 44 of the actuator takes on more of the bending forces from an impact on the bumper beam 18 when the bumper 12 is extended.

Similarly, with the embodiment of FIG. 7e—as with the embodiments of FIGS. 7b to 7d—the actuator 40 is inserted into the main frame rail member 20 such that less than about one-third of the axial length of the outer tube 44 (including the base 42) is surrounded by the main frame rail member 20. With this embodiment the outer tube 44 of the actuator 40 provides all of the bending stiffness beyond the distal end (or flange 64) of the main frame rail member 20 when the bumper member 12 is extended.

Figure 8A:
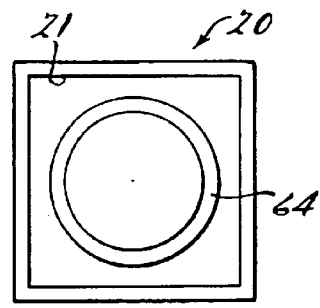
FIGS. 8a to 8c are end elevational views of alternative cross-sectional shapes of the tubular frame rail member.
Figure 8B:
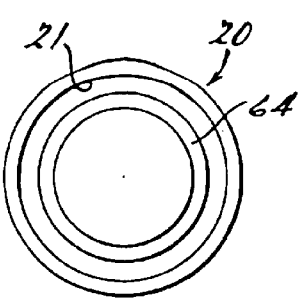
Figure 8C:
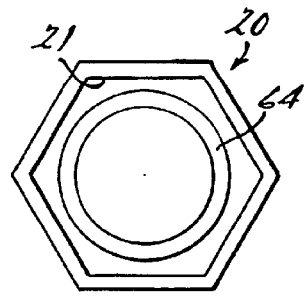

Referring to FIGS. 8a to 8c, the bending stiffness may also be adjusted by modifying the cross sectional shape of the frame rail member (including the main frame rail member 20 and the additional frame rails members 66, 166, 266) and/or the outer tube 44 of the actuator 40. For example, in the embodiment of FIG. 8a a square cross-section is used. In the embodiments of FIGS. 8b and 8c, a circular and hexagonal cross-section, respectively, is provided.

Figure 9A:
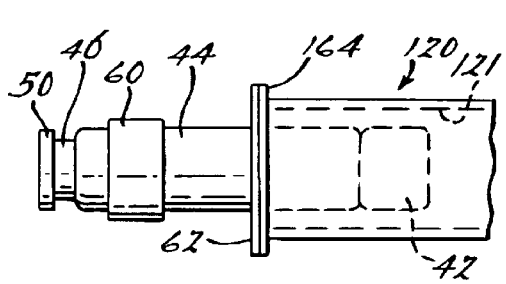
FIGS. 9a to 9f are elevational views of alternatives for attaching the preferred actuator to a preferred shortened tubular frame rail member.

Referring to FIGS. 9a to 9f, the main frame rail 120 has been shortened as compared to the standard main frame rail 20 length. Thus, these figures illustrated various preferred mounting arrangements for use with a shortened main frame rail 120. In the embodiment of FIG. 9a, the main frame rail member 120 has been shortened about one-half the length of the outer tube 44 of the actuator 40. The main frame rail member 120 surrounds less than about one-half of an axial length of the outer tubular member 44 (including the base 42 and the enlarged diameter segment 60. As with the previous embodiments, a flange 62 associated with the outer tube 44 cooperates with a flange 164 on the main frame rail member 20 to attach the two together.

Figure 9D:
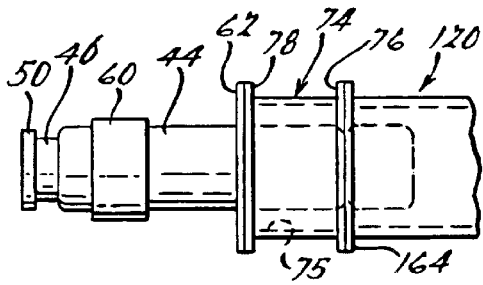
Figure 9B:
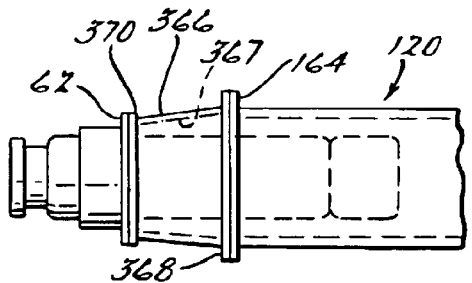
Figure 9E:
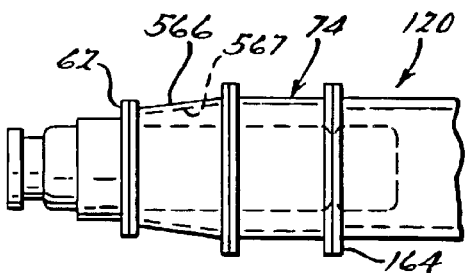
Figure 9C:
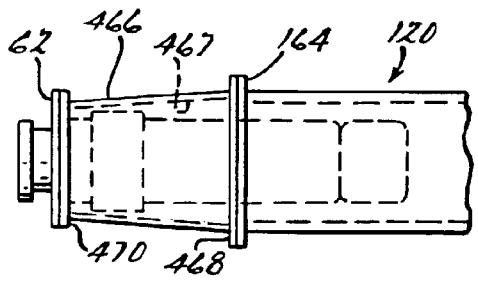

The embodiments of FIGS. 9b and 9c include a shortened main frame rail member 120 surrounding about one-half of the length of the actuator 40 as described above. The frame rails include, however, additional frame rail members 366, 466 having a generally trapezoidal shape in axial cross-section. Again, the thickness of the wall 367, 467 of these additional frame rail members 366 and 466, respectively, can be adjusted as discussed above. Cooperating flange connections 62 with 370, 164 with 368, 62 with 470, and 164 with 468 are used to join the main frame member 120, the actuator 40 and the additional frame members 366 and 466 as previously described.

Figure 9F:
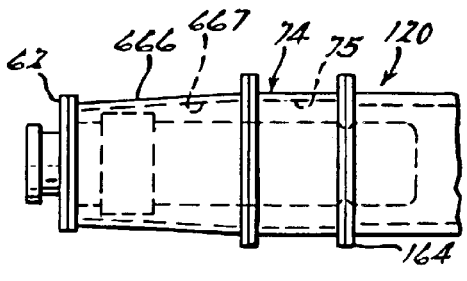

The embodiments of FIGS. 9d to 9f all have a crash box 74 as an additional frame rail member. With the embodiments of FIGS. 9e and 9f, a plurality of additional frame rail members 74 with 566 and 74 with 666, respectively, are provided. As previously described, the thickness of the wall 75 and cross-sectional shape of the crash box 74 can be modified to provide a desired performance during an impact. The crash boxes 74 include flanges 76 and 78 for attachment. The embodiments of FIGS. 9e and 9f also include an additional frame rail member 566 and 666 having a generally trapezoidal shape in axial cross-section similar to those previously described.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A bumper system for a motor vehicle comprising:
   a main tubular frame rail member,
   an actuator adapted to selectively extend and retract a bumper member, the actuator being mounted at least partially within the tubular frame rail member and wherein the actuator includes an outer tube and a telescoping inner tube, and wherein the outer tube extends beyond the main tubular frame rail member.

2. A bumper system for a motor vehicle according to claim 1, wherein the main tubular frame rail member surrounds less than about one-third of an axial length of the outer tubular member.

3. A bumper system for a motor vehicle according to claim 1, wherein the main tubular frame rail member surrounds less than about one-half of an axial length of the outer tubular member.

4. A bumper system for a motor vehicle according to claim 1, wherein the main frame rail member has a transverse cross-sectional shape which is one of a circular, square, rectangular and hexagonal shape.

5. A bumper system for a motor vehicle comprising:
   a main tubular frame rail member,
   an additional tubular frame rail member attached to and extending outwardly from the main tubular frame rail member; and
   an actuator adapted to selectively extend and retract a bumper member, the actuator being mounted at least partially within the tubular frame rail member and at least partially within the additional tubular frame rail member.

6. A bumper system for a motor vehicle according to claim 5, wherein the additional tubular frame rail member has a wall thickness which is less than a wall thickness of the main tubular frame rail member.

7. A bumper system for a motor vehicle according to claim 5, wherein the additional tubular frame rail member has a wall thickness which is greater than a wall thickness of the main tubular frame rail member.

8. A bumper system for a motor vehicle according to claim 5, wherein the additional tubular frame rail member has a generally trapezoidal axial cross-section.

9. A bumper system for a motor vehicle according to claim 5, wherein the additional tubular frame rail member has a transverse cross-sectional shape which is one of a circular, square, rectangular and hexagonal shape.

10. A bumper system for a motor vehicle according to claim 9, wherein the main tubular frame rail member has a transverse cross-sectional shape which is one of a circular, square, rectangular and hexagonal shape.

11. A bumper system for a motor vehicle according to claim 5, wherein the actuator includes an outer tube and a telescoping inner tube, and wherein the outer tube extends beyond the main tubular frame rail member.

12. A bumper system for a motor vehicle according to claim 11, wherein the main tubular frame rail member surrounds less than about one-third of an axial length of the outer tubular member.

13. A bumper system for a motor vehicle according to claim 11, wherein the main tubular frame rail member surrounds less than about one-half of an axial length of the outer tubular member.

14. A bumper system for a motor vehicle according to claim 11, wherein the additional tubular frame rail member is a plurality of additional tubular frame rail members.

15. A bumper system for a motor vehicle according to claim 14, wherein at least one of the additional tubular frame rail members has a wall thickness which is less than a wall thickness of the main tubular frame rail member.

16. A bumper system for a motor vehicle according to claim 15 wherein at least one of the additional tubular frame rail members has a generally trapezoidal axial cross-section.

17. A bumper system for a motor vehicle according to claim 5, wherein the additional tubular frame rail member is a plurality of additional tubular frame rail members.

18. A bumper system for a motor vehicle according to claim 17, wherein at least one of the additional tubular frame rail members has a wall thickness which is less than a wall thickness of the main tubular frame rail member.

19. A bumper system for a motor vehicle according to claim 11, wherein the main tubular frame rail member surrounds less than about one-half of an axial length of the outer tubular member.

* * * * *